Patented Feb. 14, 1950

2,497,347

UNITED STATES PATENT OFFICE 2,497,347

QUINOLINE DERIVATIVES

Francis Henry Swinden Curd, Justus Kenneth Landquist, Clifford Gordon Raison, and Francis Leslie Rose, Blackley, Manchester, England, assignors to Imperial Chemical Industries Limited, a corporation of Great Britain No Drawing. Application July 31, 1945, Serial No. 608,086. In Great Britain September 5, 1944

7 Claims. (Cl. 260—286)

This invention relates to the manufacture of new heterocyclic compounds, namely new quinoline and quinazoline derivatives which are useful as chemotherapeutic agents, and particularly as parasiticidal agents, especially against the parasites that cause malaria.

According to the invention we make new quinoline and quinazoline derivatives which bear in the 2-position an arylamino group (as more fully described below) and in the 4-position a basic group of the formula NR''—A—NRR' wherein R'' stands for hydrogen or an alkyl or simply substituted alkyl group such as an alkoxyalkyl or dialkylaminoalkyl group, A stands for a linking group which is aliphatic or alicyclic or aliphatic-carbocyclic and is devoid of acidic substituents but may be substituted for example, by hydrocarbon radicals, hydroxy or alkoxy groups, or dialkylaminoalkyl groups and where A or part of A is an aliphatic chain it may be interrupted by oxygen, nitrogen, or sulphur atoms, and NRR' is a strongly basic amino or substituted amino group such as alkylamino or dialkyamino or piperidino or other strongly basic nitrogen-containing heterocyclic group, or an acylated primary or secondary amino group and which optionally bear in the other nuclear positions one or more non-acidic substituents, for example, alkyl, alkoxy, halogen or nitro groups, or fused-on carbocyclic rings (as, for example, in 6:7-benzoquinazoline or 7:8-benzoquinoline), by interaction of an appropriate arylamine with a quinoline or quinazoline bearing in the 4-position the strongly basic group NR''—A—NRR' just referred to and in the 2-position a labile group such as a halogen atom or a hydrocarbon radical which is attached by an ether or thioether linkage, for example, a chlorine or bromine atom, an aryloxy group or an alkylmercapto group.

The reaction is conveniently brought about by heating the reagents together, optionally in presence of a solvent or diluent. A very convenient way of working is to use an aqueous medium with one molecular proportion each of the arylamine and the quinoline or quinazoline and one molecular proportion or a slight excess thereover of a mineral acid.

The arylamines to be used as one class of starting materials, and hence also the arylamino groups in the 2-positions of the final quinoline and quinazoline compounds may be unsubstituted or substituted but they must be devoid of acidic substituents such as sulphonic, carboxylic or phenolic groups. Thus they may bear one or more non-acidic substituents such, for example, as halogen atoms, nitro groups, hydrocarbon radicals (which themselves may optionally bear simple substituents and which may be attached to the arylamino group directly or through an oxygen, nitrogen or sulphur atom or through a sulphonyl or carbonyl group), cyano groups or esterified carboxyl groups.

The 4-basically-substituted-2-halogeno-quinolines may conveniently be made by interaction of an appropriate diamine with the requisite 2:4-dihydroxyquinoline as described in copending application of Curd, Raison, and Rose, Serial No. 608,085, of even filing date herewith, now abandoned. The corresponding quinazoline compounds are similarly made from the diamine and the requisite 2:4-dichloroquinazoline. The alternative starting materials, the quinazolines or quinolines containing ether or thioether groups, can readily be made by interaction of the 2-halogeno derivatives with the appropriate hydroxy or mercapto compounds or with alkali metal derivatives of such compounds.

In many of these new 2-arylamino-4-substituted-quinolines or -quinazolines a substituent in the arylamino group or in the quinoline or quinazoline nucleus (and more particularly in the benzene ring thereof) is capable of ready conversion into another suitable substituent. Thus, for example, a nitro group may be reduced to an amino group and this in turn may, if desired, be converted to a halogen atom or a cyano group. Also in those cases where the substituent in the 4-position is the radical of an acylated diamine the acyl radical can readily be removed, for example, by heating with a dilute acid.

Still a different mode of synthesis is disclosed in our copending application of even date, Serial No. 608,088, now Patent No. 2,488,379. This mode of synthesis consists of starting with a quinoline or quinazoline compound having an arylamino radical, e. g. p-chlorophenylamino, in the 2-position, and a labile atom or group, e. g. halogen, alkoxy, aryloxy or arylmercapto, in the 4-position. This compound is then reacted with an alkylene diamine compound of the formula HNR''—A—NRR' as above defined, whereby the labile atom becomes replaced by the basic radical —NR''—A—NRR'.

The new compounds are, in the main, colourless or pale yellow. They are viscous oils or crystalline solids which are strongly basic and form salts with mineral and organic acids. The salts with mineral acids such as hydrogen halides, sulphuric and phosphoric acids or with lower organic acids such as acetic, lactic, tartaric and lower alkanesulphonic acids (e. g. methanesulphonic acid) are water-soluble. The salts with acids of higher molecular weight such as methylene-bis-2:3-hydroxynaphthoic acid and methylene-bis-salicylic acid are more sparingly soluble in water.

The following examples illustrate, but do not limit, the invention. The parts are by weight.

*Example 1*

3 parts of 2-chloro-4-γ-diethylaminopropyl-aminoquinazoline dihydrate (M. P. 68° C.) and 3 parts of p-anisidine are heated together at 130°–140° C. for 3 hours. The clear glassy melt is mixed with 100 parts of water and the mixture is made alkaline by the addition of sodium carbonate and steam distilled to remove the excess of p-anisidine. The non-volatile oil remaining is dissolved in acetic acid and any undissolved impurities are removed by filtration. The cooled filtrate is made strongly alkaline with caustic soda solution and the base which is precipitated is extracted with ether. The ether solution is dried over anhydrous sodium sulphate and the ether is removed by distillation. The residual oil solidifies on standing, and is recrystallised from petroleum ether (B. P. 100°–120° C.). It is 2-p-methoxyanilino - 4-γ-diethylaminopropylamino - quinazoline. It forms colourless needles, M. P. 114°–115° C.

In a similar manner the following compounds may be made: 2-anilino-4-γ-diethylaminopropyl-aminoquinazoline (prisms, M. P. 112°–114° C. from petrol), 2-p-toluidino-4-γ-diethylamino-propylaminoquinazoline (needles, M. P. 94° C., from petrol), 2-β-naphthylamino-4-γ-diethyl-aminopropylaminoquinazoline (needles, M. P. 141° C. from aqueous ethanol) and 2-p-chloro-anilino- 4-γ-diethylaminopropylaminoquinazoline (prisms, M. P. 127° C. from petrol).

*Example 2*

4.65 parts of 2-chloro-4-β-diethylaminoethyl-aminoquinazoline monohydrate (M. P. 80°–81° C.) and 4.6 parts of p-thioanisidine are heated together in an oil bath at 130°–140° C. for 3 hours. The clear glassy melt is diluted with 50 parts of water and the mixture is made alkaline to Brilliant Yellow paper and steam distilled to remove unchanged p-thioanisidine. The residual oil is dissolved up in acetic acid, and the solution is filtered and made strongly alkaline with caustic soda. The base which is precipitated is extracted with ether, the ether solution is dried over anhydrous sodium sulphate and the ether is distilled off. The residue is 2-p-methylmercapto-anilino-4-β - diethylaminoethylaminoquinazoline. It forms a sticky glass which on treatment with hydrochloric acid yields a crystalline dihydrochloride of M. P. 130°–131° C.

In a similar manner, by employing β-naph-thylamine instead of p-thioanisidine, 2-(2'-naph-thylamino) - 4-β-diethylaminoethylaminoquin - azoline (needles, M. P. 126° C. from aqueous ethanol) is obtained.

*Example 3*

5.6 parts of 2-chloro-4-β-diethylaminoethyl-aminoquinazoline monohydrate, 5.1 parts of p-chloroaniline and 10 parts of glacial acetic acid are boiled under reflux for 2 hours. The mixture is poured into 100 parts of water and the solution is filtered from undissolved material (p-chloro-acetanilide). The filtrate is treated with half the amount of caustic soda required to make it alkaline to Brilliant Yellow paper (determined by separate test on an aliquot portion of the solution) and any unchanged p-chloroaniline is removed by extraction with ether. The aqueous solution is made strongly alkaline with caustic soda, and the base which is liberated is extracted with ether. The ether solution is extracted twice with 5% aqueous acetic acid (100 parts and 20 parts) and the acid extracts are combined and stirred with decolourising carbon (1 part), filtered and treated with 30 parts of concentrated hydrochloric acid. After a short time the dihydrochloride of 2-p-chloroanilino-4-β - diethyl-aminoethylaminoquinazoline separates out as a felted mass of white needls, M. P. 254–255° C. The free base, readily obtained by adding an excess of caustic soda to the hydrochloride, crystallises from petrol in small white prisms, M. P. 111–112° C.

Instead of the acetic acid, β-ethoxyethanol or phenol may be employed as a solvent.

In a similar manner, by employing 2-chloro-4-β-dimethylaminoethylaminoquinazoline (M. P. 96°–98° C.), 2-chloro-4-γ-dimethylaminopropyl-aminoquinazoline (M. P. 74° C.), 2-chloro-4-γ-n-butylaminopropylaminoquinazoline (sinters at 94° C., M. P. indefinite), 2-chloro-4-δ-diethyl-aminobutylaminoquinazoline (monohydrate, M. P. 71° C.) and 2-chloro-4-γ-piperidinopropyl-aminoquinazoline (M. P. 148° C.) instead of the 2 - chloro - 4 - β - diethylaminoethylaminoquin-azoline there are obtained, respectively, 2-p-chloroanilino-4 - β - dimethylaminoethylamino-quinazoline (dihydrochloride, M. P. 267–268° C.), 2-p-chloroanilino - 4 - γ - dimethylaminopropyl-aminoquinazoline (dihydrochloride, M. P. 256°–258° C.), 2-p-chloroanilino-4-γ-n-butylamino-propylaminoquinazoline (dihydrochloride, M. P. 254°–256° C.), 2-p-chloroanilino-4 - δ - diethyl-aminobutylaminoquinazoline (dihydrochloride, M. P. 260–262° C.) and 2-p-chloroanilino-4-γ-piperidinopropylaminoquinazoline (dihydrochloride, M. P. 285–286° C.).

*Example 4*

A mixture of 8.1 parts of 4-γ-diethylamino-propylamino-2-chloroquinoline, 10.65 parts of p-chloroaniline and 0.1 part of potassium iodide is heated with stirring in an oil bath at 200° C. for 6 hours. After cooling, the reaction mixture is dissolved in dilute hydrochloric acid, the solution is basified with caustic soda and the product which separates out is extracted with chloroform. The chloroform is distilled off and to the residue 100 parts of 5% acetic acid are added and the mixture shaken with ether. The dilute acetic acid solution is separated, basified with caustic soda and shaken with chloroform. The chloroform extract is dried with anhydrous potassium carbonate, and the chloroform is distilled off. The remaining oil solidifies on cooling, and after crystallisation from benzene gives crystals of 4-γ-diethylaminopropylamino - 2 - p-chloroanilino-quinoline melting at 154°–156° C.

*Example 5*

6 parts of 2-chloro - 4 - β - diethylaminoethyl-aminoquinazoline monohydrate, 4.5 parts of 6-bromo-2-naphthylamine and 10 parts of glacial acetic acid are boiled under reflux for 2 hours. The mixture is cooled, diluted with 200 parts of water and filtered, and the solid residue is extracted repeatedly with 5% aqueous acetic acid (in all 500 parts). The acid extracts are combined and concentrated hydrochloric acid is added whereupon 2-(6' - bromo - 2' - naphthylamino) - 4 - β - diethylaminoethylaminoquinazoline dihydrochloride is precipitated. This is purified by recrystallisation from water and then has M. P. 284°–285° C.

In a similar manner, by employing 4.2 parts of 4:8-dichloro-2-naphthylamine instead of the 4.5 parts of 6-bromo-2-naphthylamine, 2-(4':8'-dichloro - 2' - naphthylamino) - 4 - β - diethylaminoethylaminoquinazoline dihydrochloride, M. P. 284° C. is obtained.

Example 6

6.3 parts of 2:7-dichloro - 4 - β - diethylaminoethylaminoquinazoline (dihydrate, M. P. 84°–85° C.), 5.1 parts of p-chloroaniline and 10 parts of glacial acetic acid are boiled under reflux for 2 hours. The mixture is cooled, diluted with 80 parts of water, filtered from p-chloroacetanilide, and made just alkaline to Clayton Yellow paper with sodium hydroxide solution. The mixture is then steam distilled, whereby unchanged p-chloroaniline is removed. The quinazoline (as free base) separates out in the distillation vessel and is filtered off when cold and dissolved in 100 parts of hot 5% aqueous acetic acid. The solution is filtered, and 50 parts of concentrated hydrochloric acid are added whereupon 7-chloro-2-p-chloroanilino - 4 - β-diethylaminoethylaminoquinazoline dihydrochloride is precipitated in the form of small white needles, M. P. 280°–283° C. The free base readily obtained by treatment of the hydrochloride with an excess of caustic soda crystallises from petrol as yellowish white nodular masses, M. P. 121°–122° C.

In a similar manner, by employing, 6.3 parts of 2:6 - dichloro-4-β-diethylaminoethylaminoquinazoline (M. P. 135°–136° C.), 5.85 parts of 2-chloro-4-β-diethylaminoethylamino - 7 - methylquinazoline (M. P. 112° C.), 6.17 parts of 2-chloro-4-β-diethylaminoethylamino - 7 - methoxyquinazoline (M. P. 54° C.) or of 2-chloro-4-β-diethylaminoethylamino - 6-methoxyquinazoline (tetrahydrate, M. P. 64° C.) or of 2-chloro-4-β-diethylaminoethylamino-8-methoxyquinazoline (M. P. 134°–135° C.) or 6.47 parts of 2-chloro-4-β-diethylaminoethylamino-7-nitroquinazoline (M. P. 88°–92° C.) instead of the 6.3 parts of 2:7-dichloro - 4-β-diethylaminoethylaminoquinazoline, 2-p-chloroanilino-4-β - diethylaminoethylamino-6-chloroquinazoline (dihydrochloride, M. P. 282° C.), 2-p-chloroanilino-4 - β - diethylaminoethylamino - 7 - methylquinazoline (dihydrochloride, M. P. 264° C.), 2-p-chloroanilino-4-β-diethylaminoethylamino-7 - methoxyquinazoline (dihydrochloride, M. P. 230°–232° C.), 2-p-chloroanilino - 4 - β - diethylaminoethylamino-6-methoxyquinazoline (dihydrochloride, M. P. 248°–249° C.), 2-p - chloroanilino-4-β-diethylaminoethylamino-8-methoxyquinazoline (dihydrochloride, M. P. 274°–275° C.), or 2-p-chloroanilino-4-β-diethylaminoethylamino - 7 - nitroquinazoline (M. P. 160° C.) may be obtained.

Example 7

7 parts of 2-chloro - 4 - β - diethylaminoethylamino-6:7-benzoquinazoline (M. P. 150° C.), 5.1 parts of p-chloroaniline and 10 parts of glacial acetic acid are boiled under reflux for 2 hours. The mixture is diluted with 80 parts of water, heated to 70° C. and filtered. The residue is extracted twice with 60 parts of water at 70° C. The combined filtrates, which set to a gel on cooling, are heated until clear, and 30 parts of concentrated hydrochloric acid are added. 2-p-chloroanilino - 4 - β - diethylaminoethylamino - 6:7-benzoquinazoline dihydrochloride separates as a yellow solid and is purified by crystallisation from 150 parts of hot water with the addition of 20 parts of concentrated hydrochloric acid to assist the separation of the salt in a filterable form. It is a sulphur yellow powder, M. P. 286°–287° C.

Example 8

6.77 parts of 2-chloro-4-β-diethylaminoethylamino-6:7-dimethoxyquinazoline (M. P. 116°–117° C.), 5.1 parts of p-chloroaniline and 10 parts of glacial acetic acid are boiled under reflux for 3 hours. The mixture is cooled, diluted with 80 parts of water at 60–70° C. and filtered from p-chloroacetanilide, the latter being washed with 50 parts of water. The filtrate and washings are combined, made alkaline by the addition of sodium carbonate and steam distilled to remove p-chloroaniline. The oil which remains in the distillation vessel is separated from the aqueous liquor and dissolved in 50 parts of 5% aqueous acetic acid and the solution is clarified with decolourising charcoal. 30 parts of concentrated hydrochloric acid are then added, whereby the dihydrochloride of 2-p-chloroanilino - 4 -β - diethylaminoethylamino - 6:7 - dimethoxyquinazoline is precipitated. After recrystallisation from water this melts at 255°–256° C.

Example 9

6 parts of 2-chloro - 4 - β - diethylaminoethylaminoquinazoline monohydrate, 3.3 parts of p-chloroaniline hydrochloride, 20 parts of water and 0.1 part of concentrated hydrochloric acid are stirred and heated together under reflux for 1 hour. The solution is then cooled, whereupon 2 - p-chloroanilino-4-β-diethylaminoethylaminoquinazoline dihydrochloride separates out. It is filtered off and recrystallised from water; it then has M. P. 254°–256° C.

By working in a similar manner, but using 6.1 parts of 2-chloro-4 - γ - piperidinopropylaminoquinazoline or 5 parts of 2-chloro-4-β-dimethylaminoethylaminoquinazoline or 6.9 parts of 2-chloro - 4-β-diethylaminoethylamino - 5 - methoxyquinazoline dihydrate instead of the 2-chloro-4 - β - diethylaminoethylaminoquinazoline there are obtained, respectively, 2-p-chloroanilino-4-γ-piperidinopropylaminoquinazoline dihydrochloride (M. P. 285°–286° C.), 2-p-chloroanilino-4-β-dimethylaminoethylaminoquinazoline dihydrochloride (M. P. 267°–268° C.) or 2-p-chloroanilino-4-β-diethylaminoethylamino - 5 - methoxyquinazoline dihydrochloride (M. P. 187°–188° C.).

Likewise by condensing 6 parts of 2-chloro-4-β-diethylaminoethylaminoquinazoline monohydrate with 3.5 parts of p-nitroaniline hydrochloride under these same conditions there is obtained 2-p-nitroanilino - 4 - β-diethylaminoethylaminoquinazoline dihydrochloride of M. P. 286°–287° C.

Example 10

6.5 parts of 2-chloro-6-nitro-4-β-diethylaminoethylaminoquinazoline, 5.1 parts of p-chloroaniline and 10 parts of glacial acetic acid are refluxed together for 4 hours. The reaction mixture is diluted with 100 parts of water, heated to boiling and filtered, and the solid residue is extracted with a further 100 parts of boiling water. The extract is added to the filtrate and 100 parts of concentrated hydrochloric acid are added, whereupon 2-p-chloroanilino-6-nitro-4-β-diethylaminoethylaminoquinazoline dihydrochloride is precipitated. It is filtered off and recrystallised from water; it then has M. P. 266° C.

The free base is readily obtained by adding caustic soda to an aqueous solution of the dihydrochloride; after crystallisation from ethanol or β-ethoxyethanol it has M. P. 200°–201° C. It can be readily reduced with hydrogen at ordinary pressure and a Raney nickel catalyst in methanol to the corresponding 6-amino compound. 2-p-chloroanilino - 6 - amino-4-β-diethylaminoethylamino-quinazoline trihydrochloride crystallises from water as a pentahydrate with M. P. 180° C., solidifying again on further heating and remelting at 286° C.

*Example 11*

17.7 parts of 2-chloro-4-β-acetylaminoethylaminoquinazoline (M. P. 206°–207° C.), 9 parts of p-chloroaniline and 30 parts of glacial acetic acid are refluxed together for 3 hours. The mixture is diluted with 300 parts of hot water and filtered. 100 parts of saturated sodium chloride solution and 30 parts of concentrated hydrochloric acid are added to the filtrate, whereupon 2-p-chloroanilino - 4 - β - acetylaminoethylaminoquinazoline hydrochloride is precipitated in the form of white platelets, M. P. 278°–280° C. The residue which remained undissolved by the aqueous acetic acid is converted to the free base by triturating with 20 parts of cold ethanol and 7 parts of 30% sodium hydroxide solution and 100 parts of water are added whereupon 2-p-chloroanilino-4-β-acetylaminoethylaminoquinazoline separates out. After crystallisation from ethanol it has M. P. 183°–184° C.

8.5 parts of 2-p-chloroanilino-4-β-acetylaminoethylaminoquinazoline, 30 parts of concentrated hydrochloric acid, 15 parts of water and 50 parts of ethanol are refluxed together for 3 hours, and the mixture is then poured into 300 parts of 5% caustic soda solution. The base which is precipitated is purified by crystallisation from petroleum ether, or by conversion to its dihydrochloride and crystallisation from water. 2-p-chloroanilino-4-β-aminoethylaminoquinazoline crystallises from petroleum ether in fine needles of M. P. 132° C. The dihydrochloride is a white solid, M. P. 314°–316° C.

*Example 12*

6 parts of 2-chloro-4-β-diethylaminoethylmethylamino-quinazoline trihydrate, 5.1 parts of p-chloroaniline and 10 parts of glacial acetic acid are refluxed together for 3 hours. The reaction mixture is diluted with 100 parts of boiling water and filtered. The residue is washed with 50 parts of boiling water and the extract is added to the filtrate. This solution is then made alkaline with caustic soda whereupon a mixture of the base and unchanged p-chloroaniline separates out. The while mixture is steam distilled to remove the p-chloroaniline. The residue in the distillation vessel is then extracted with ether. The ether is evaporated off and the residue is crystallised from ligroin or from aqueous ethanol. 2-p-chloroanilino - 4 - methyl-β-diethylaminoethylaminoquinazoline dihydrate is thus obtained as colourless crystals, M. P. 76° C.

*Example 13*

6 parts of 2-chloro-4-β-diethylaminoethylaminoquinazoline monohydrate and 6.5 parts of N-ethylaniline are heated together at 140°–150° C. for 2 hours. The reaction mixture is diluted with water and made alkaline by the addition of sodium carbonate. A mixture of the base with unchanged ethylaniline separates out. The whole mixture is steam distilled to remove the ethylaniline. The residue in the distillation vessel is then acidified with acetic acid and filtered and caustic soda solution in excess is added to the filtrate whereupon 2-N-ethylanilino-4-β-diethylaminoethylaminoquinazoline is precipitated as a crystalline solid. After recrystallisation from aqueous ethanol it has M. P. 110° C.

*Example 14*

A mixture of 5.15 parts of 2-chloro-4-γ-diethylaminopropylaminoquinoline, 2.25 parts of p-chloroaniline, 2 parts of concentrated hydrochloric acid, 20 parts of water and 5 parts of ethanol, is boiled under reflux for 48 hours. After cooling, sodium acetate solution is added until further addition no longer produces a precipitate. This precipitate is unchanged p-chloroaniline; it is extracted with ether and discarded. The remaining aqueous solution is made alkaline with caustic soda, whereupon 2-p-chloroanilino-4-γ-diethylaminopropylaminoquinoline is precipitated and is filtered off. After crystallisation from benzene it has M. P. 155°–156° C.

*Example 15*

A mixture of 9.65 parts of 2-chloro-4-γ-diethylaminopropylamino-3-methylquinoline, 12.1 parts of p-chloroaniline and 0.1 part of potassium iodide is heated at 200° C. for 12 hours. After cooling, the reaction mixture is dissolved in dilute hydrochloric acid, the solution is made alkaline with caustic soda and the precipitate which is formed is extracted with chloroform. The chloroform is distilled off, 150 parts of 5% acetic acid are added to the residue and the mixture is shaken with ether. The ether layer is discarded and the aqueous acetic acid solution made alkaline with caustic soda and extracted with chloroform. The chloroform extract is dried over anhydrous potassium carbonate and the chloroform is distilled off. The residual oil consists of 2-p-chloroanilino-4-γ-diethylamino-propylamino - 3 - methylquinoline. It forms a diperchlorate which crystallises in colourless needles from ethanol and melts at 216°–218° C.

*Example 16*

A mixture of 8 parts of 2-chloro-4-β-diethylaminoethylaminoquinoline, 10 parts of p-chloroaniline and 0.1 part of potassium iodide is heated with stirring at 200° C. for 10 hours. After cooling, the mixture is dissolved in dilute hydrochloric acid, the solution is made alkaline with caustic soda and the precipitate which is formed is extracted with chloroform. The chloroform is distilled off. 100 parts of 5% acetic acid are added to the residue and the mixture is shaken with ether. The ether layer is discarded. The aqueous acetic acid solution is made alkaline with caustic soda and the base which is precipitated is extracted with chloroform. The chloroform solution is dried over anhydrous potassium carbonate and the chloroform is distilled off. The remaining oil consists of 2 - p - chloroanilino-4-β-diethylaminoethylaminoquinoline. It forms dihydrochloride, M. P. 169°–171° C.

*Example 17*

8.96 parts of 2:7-dichloro-4-γ-diethylaminopropylaminoquinoline, 10.6 parts of p-chloroaniline and 0.1 part of potassium iodide are heated at 200° C. with stirring for 8 hours. After cooling the reaction mixture is diluted with water and sufficient caustic soda is added to render the mixture strongly alkaline. Unchanged p-chloroaniline is then removed by steam distillation. The residual oil is separated off and dissolved in 5% aqueous acetic acid. After extraction with ether to remove final traces of p-chloroaniline the acetic acid solution is made alkaline with caustic soda and the base which is precipitated is extracted with chloroform. The chloroform solution is dried and the chloroform is distilled off. 2-p-chloroanilino-7-chloro-4-$\gamma$-diethylaminopropylaminoquinoline remains. After crystalisation from a mixture of benzene and petroleum ether it has M. P. 144°–145° C.

Whereas the above description and examples illustrate many widely varied embodiments of the invention, it will be apparent to one skilled in the art that many other embodiments and variations may be devised without departing from the spirit and scope thereof and accordingly it is to be understood that the invention is not in any way limited except as defined in the following claims.

In the claims below, the expression "N-radical" when referring to a nitrogenous base shall be understood as referring to the radical obtained by removing one of the hydrogen atoms which are (or the only hydrogen atom which is) attached to the nitrogen atom of the specified base. The expression "devoid of acidic substituents" as used in the claims shall be construed as referring to freedom from radicals which are commonly recognized as ionizable, salt-forming acid radicals, as typified by the carboxy, sulfonic acid and phenolic OH radicals.

We claim:

1. A compound selected from the group consisting of the salts and free-base form of 2-arylamino-4-substituted quinolines, which in the form of free base have the formula

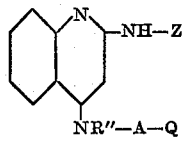

wherein Z stands for an aryl radical of the benzene series being devoid of acidic substituents, R'' designates a member of the group consisting of hydrogen and lower alkyl, A stands for an aliphatic radical devoid of acidic substituents, while the radical Q represents the N-radical of a nitrogenous base selected from the group consisting of lower monoalkyl amines, lower dialkyl amines and saturated heterocyclic amines.

2. As new compounds, 2-arylamino-4-substituted quinolines having the general formula:

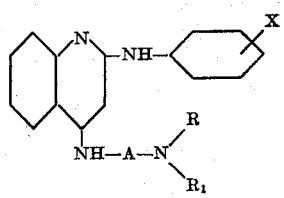

wherein A is a lower alkylene radical; R and $R_1$ are lower alkyl radicals, and X is a halogen radical.

3. As new compounds, 2-arylamino-4-substituted quinolines having the general formula:

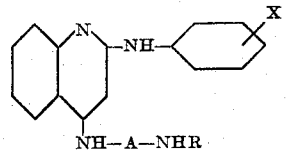

wherein A is a lower alkylene radical; R is a lower alkyl radical, and X is a halogen radical.

4. Compounds as claimed in claim 2, wherein X is a chlorine radical in the para-position.

5. 2-p-chloroanilino-4-$\beta$-diethylaminoethylaminoquinoline.

6. 2-p-chloroanilino-4-$\gamma$-diethylaminopropylaminoquinoline.

7. 7-chloro-2-p-chloroanilino-4-$\gamma$-diethylaminopropylaminoquinoline.

FRANCIS HENRY SWINDEN CURD.
JUSTUS KENNETH LANDQUIST.
CLIFFORD GORDON RAISON.
FRANCIS LESLIE ROSE.

REFERENCES CITED

The following references are of record in the file of this patent:

UNITED STATES PATENTS

| Number | Name | Date |
|---|---|---|
| 2,233,970 | Andersag et al. | Mar. 4, 1941 |

FOREIGN PATENTS

| Number | Country | Date |
|---|---|---|
| 134,279 | Switzerland | Oct. 1, 1929 |
| 669,806 | Germany | Jan. 4, 1939 |
| 681,980 | Germany | Oct. 5, 1939 |

OTHER REFERENCES

Niementowski: Berichte 40, 4285–4294, 1907.
Buchmann et al.: J. Am. Chem. Soc., 64, 1357–1360 (June 1942).
Wiselogle: "Survey of Antimalarial Drugs 1941–1945" (J. W. Edwards, Ann Arbor, Mich., 1946) vol. II, p. 1152.